(12) United States Patent
Michiels

(10) Patent No.: US 9,857,086 B2
(45) Date of Patent: Jan. 2, 2018

(54) PIPE CLAMP

(71) Applicant: Q-clip B.V., Mierlo (NL)

(72) Inventor: Milenko Michiels, Helmond (NL)

(73) Assignee: Q-CLIP B.V., AG Mierlo (NL)

( * ) Notice: Subject to any disclaimer, the term of this patent is extended or adjusted under 35 U.S.C. 154(b) by 0 days.

(21) Appl. No.: 14/352,643

(22) PCT Filed: Oct. 19, 2012

(86) PCT No.: PCT/NL2012/050731
§ 371 (c)(1),
(2) Date: Apr. 17, 2014

(87) PCT Pub. No.: WO2013/058656
PCT Pub. Date: Apr. 25, 2013

(65) Prior Publication Data
US 2015/0122957 A1 May 7, 2015

(30) Foreign Application Priority Data

Oct. 21, 2011 (NL) .................................... 2007639
May 9, 2012 (NL) .................................... 2008782

(51) Int. Cl.
*F16L 3/10* (2006.01)
*F24D 3/14* (2006.01)
(Continued)

(52) U.S. Cl.
CPC ............... *F24D 3/144* (2013.01); *F16L 3/10* (2013.01); *F16L 3/1075* (2013.01); *F16L 3/13* (2013.01); *F16L 3/2235* (2013.01)

(58) Field of Classification Search
CPC ... F16L 3/13; F16L 3/10; F16L 3/1008; F16L 3/1033; F16L 3/12; F16L 3/02; F16L 3/04; F16L 3/06; F16L 3/08; F24D 3/144
(Continued)

(56) References Cited

U.S. PATENT DOCUMENTS

| 4,775,121 | A | * | 10/1988 | Carty | ..................... F16L 3/2235 24/543 |
| H001012 | H | * | 1/1992 | Senatro | ................. F16L 3/2235 248/68.1 |

(Continued)

FOREIGN PATENT DOCUMENTS

| CN | 201462201 U | 5/2010 |
| DE | 3014789 A1 | 1/1982 |

(Continued)

*Primary Examiner* — Nkeisha Smith
(74) *Attorney, Agent, or Firm* — Oppedahl Patent Law Firm LLC

(57) ABSTRACT

The invention relates to a pipe clamp for coupling a pipe to a mesh reinforcement, provided with two co-acting arcuate parts. The pipe clamp comprises a hinge coupled to respective first ends of a first and a second arcuate part, and a divided closure, wherein the arcuate parts are provided with a first recess for clamping round the pipe on a first wire of the mesh reinforcement in the closed position. Because the mesh reinforcement can be provided with meshes of wires which run transversely over each other and may be a different distance from the pipe, the pipe clamp is further provided with a second recess, wherein one of the two recesses is always located between at least one of the closing parts and the other recess, whereby the pipe can be fixed flat over the mesh reinforcement.

14 Claims, 4 Drawing Sheets

(51) Int. Cl.
*F16L 3/223* (2006.01)
*F16L 3/13* (2006.01)

(58) Field of Classification Search
USPC ...... 248/67.5, 74.4, 74.1, 73, 72, 68.1, 67.7, 248/65
See application file for complete search history.

(56) References Cited

U.S. PATENT DOCUMENTS

| | | | |
|---|---|---|---|
| 5,115,542 A | 5/1992 | Gehres | |
| 5,820,048 A * | 10/1998 | Shereyk | F16L 3/1215 24/487 |
| 7,770,850 B2 * | 8/2010 | Allmann | F16L 3/2235 248/65 |
| 8,579,239 B2 * | 11/2013 | Lothamer | B60R 16/0215 24/16 R |
| 8,672,276 B2 * | 3/2014 | Fukumoto | F16L 3/2235 248/316.1 |
| 8,708,289 B2 * | 4/2014 | Allenbach | F16L 3/2235 248/68.1 |
| 8,708,290 B2 * | 4/2014 | Franta | B65H 57/003 248/219.3 |
| 8,882,066 B2 * | 11/2014 | Otten | B65D 63/00 248/229.14 |
| 8,910,912 B2 * | 12/2014 | Child | F16L 3/2235 248/68.1 |
| 9,080,698 B2 * | 7/2015 | Fukumoto | F16L 3/2235 |
| 2002/0070317 A1 * | 6/2002 | Goodman | E21B 17/1035 248/74.1 |
| 2003/0208897 A1 | 11/2003 | Mangone, Jr. | |
| 2011/0315830 A1 * | 12/2011 | Eshima | H02G 3/32 248/74.1 |
| 2012/0056045 A1 * | 3/2012 | Franta | B65H 57/06 248/49 |
| 2014/0091182 A1 * | 4/2014 | Fukumoto | F16L 3/2235 248/68.1 |
| 2015/0176726 A1 * | 6/2015 | Bacon | F16L 3/1215 248/74.4 |
| 2015/0187460 A1 * | 7/2015 | DeLoache | H02G 3/266 248/68.1 |

FOREIGN PATENT DOCUMENTS

| | | |
|---|---|---|
| DE | 3045906 A1 | 7/1982 |
| DE | 3931805 A1 | 4/1991 |
| DE | 4320590 A1 | 1/1995 |
| EP | 0044469 A1 | 1/1982 |
| EP | 1783436 A2 | 5/2007 |
| GB | 613338 A | 11/1948 |
| WO | 2008146471 A1 | 12/2008 |
| WO | 2009122119 A1 | 10/2009 |
| WO | 2013058656 A1 | 4/2013 |

\* cited by examiner

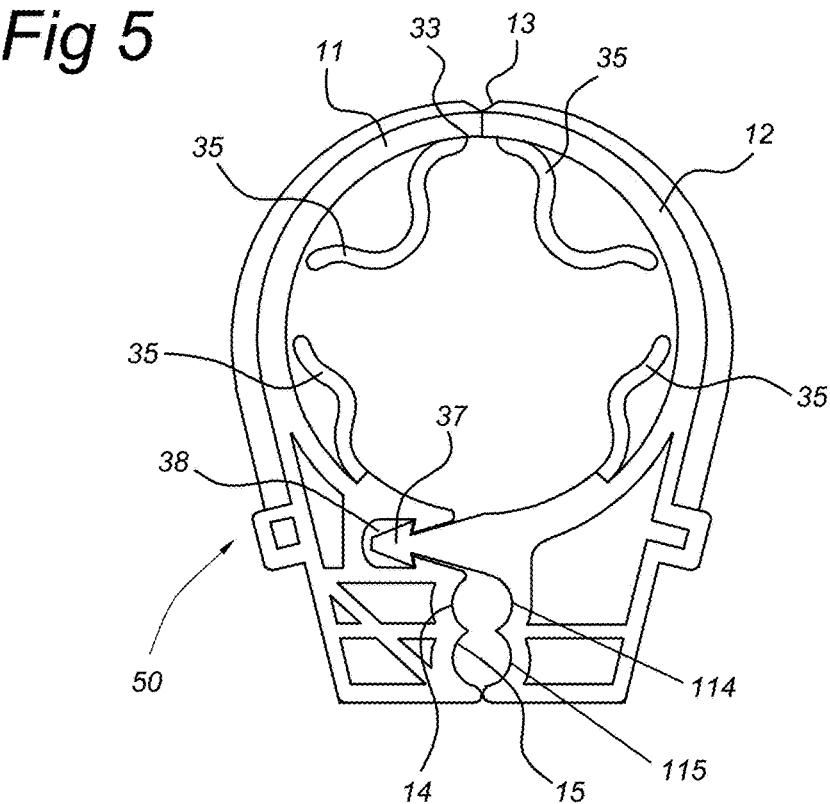
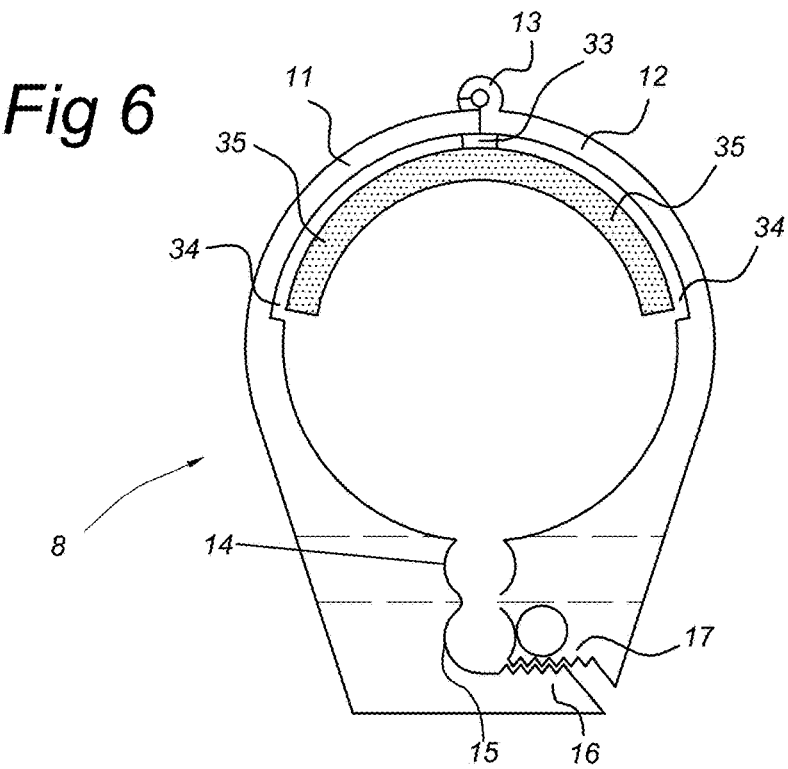

PIPE CLAMP

TECHNICAL FIELD

The invention relates to a pipe clamp for coupling a pipe to a mesh reinforcement.

BACKGROUND OF THE INVENTION

Such a pipe clamp is known from EP 1783436 A1. Pipe clamps can be used to fix for instance floor heating pipes of a floor heating system to a mesh reinforcement on a concrete floor. During the construction of a building, for instance a dwelling or a commercial or industrial building, a floor heating system is arranged on a substrate of respectively a concrete layer, an insulating layer and a mesh reinforcement. The mesh reinforcement consists of a mat of mutually connected metal wires with a determined fixed diameter. The diameter can lie in a range of between 3 and 10 mm. The metal wires in the mesh reinforcement can form square meshes, wherein some of the metal wires are directed in a first direction and the other metal wires are directed in a second direction perpendicularly of the first direction. At the intersections of the metal wires a wire directed in the first direction will run over a wire directed in the other direction.

When the floor heating pipe is attached to the mesh reinforcement using the known pipe clamp, the floor heating pipe will follow the relief of the mesh reinforcement. A further drawback is that a different pipe clamp must be used for a different pipe diameter in order to obtain a connection with clamping fit between the pipe and the mesh reinforcement.

SUMMARY OF THE INVENTION

It is an object of the invention to provide a pipe clamp which is suitable for the purpose of arranging pipes of differing diameter in rapid and flat manner over the mesh reinforcement.

According to a first aspect of the invention, this and other objects are achieved with a pipe clamp as described in claim 1.

Owing to this configuration of the first recess and the second recess the pipe clamp can be used to clamp the pipe fixedly onto the mesh reinforcement, wherein the pipe runs flat over the wires of the mesh reinforcement, and wherein the first or the second recess of the pipe clamp can be used depending on the distance of the plane to one of the wires of the mesh reinforcement. For fixing purposes the pipe clamp is arranged round the pipe and the wire of the mesh reinforcement, wherein the first or the second recess is used to clamp the wire of the mesh reinforcement and, using clamping pliers, the first closing part is coupled to the second closing part by the co-acting closing parts so that the pipe clamp clamps fixedly round the pipe and the wire. The first and the second closing parts can for instance form a snap connection or a connection by means of a co-acting toothing.

It is noted that a pipe clamp according to the preamble of claim 1 is known from DE 4320590. The known pipe clamp is adapted to clamp the wire of the mesh reinforcement between the closing parts.

In an embodiment the pipe clamp is provided with a third recess close to the second end of the respective arcuate parts, wherein the clamping opening of the third recess lies transversely of the clamping openings of the first and second recess. Owing to these additional recesses the pipe clamp is suitable for fastening the pipe at an intersection of wires, wherein the first or the second recesses are used to fasten the pipe to a first wire of the mesh reinforcement and the third recesses are used to clamp the pipe to a second wire of the mesh reinforcement crossing the first wire transversely. The choice for the first or the second recess then depends on the distance of the first and the second wire from the centre of the pipe, so that the pipe can lie flat.

In an embodiment the hinge can be integrated into the first ends of the co-acting arcuate parts. Integration of the hinge in the pipe clamp makes it possible to manufacture the clamp as one whole in for instance plastic.

In an embodiment the respective arcuate parts are provided on an inner side with a clamping element for clamping a peripheral part of the pipe in a closed position of the pipe clamp.

Placing the clamping elements between the arcuate parts and the pipe enables the pipe clamp to clamp pipes of different diameters. The clamping elements can be arcuate.

In an embodiment of the pipe clamp the first ends of the respective clamping elements are coupled to the hinge via a coupling. Owing to this construction the pipe clamp can be manufactured as one whole.

In an embodiment of the pipe clamp the respective arcuate parts are provided with a further recess for receiving the clamping element. When the diameter of the pipe to be fastened is sufficiently small relative to the diameter of a pipe clamp in closed position, the clamping elements will not be pressed into the further recesses during fastening of the pipe and the clamping elements will clamp the pipe along a part of the periphery which makes contact with the clamping elements and another peripheral part of the arcuate elements. At a larger diameter of the pipe to be fastened the filler elements will be pressed into the further recesses of the arcuate parts during fastening of the pipe, and the filler elements will clamp the pipe fittingly along a part of the periphery which makes contact with the clamping elements and a further peripheral part of the arcuate elements.

In an embodiment of the pipe clamp, in a first position of the coupling the clamping elements partially fill the further recess for the purpose of clamping a pipe with a first diameter to a wire of the mesh reinforcement.

In a further embodiment of the pipe clamp, in a second position of the coupling the clamping elements fill the further recesses for the purpose of clamping a pipe with a second diameter which is greater than the first diameter. Using the pipe clamp provided with the clamping elements different pipes with a respective diameter of for instance 16 mm and 17 mm or 16 mm and 18 mm, 18 mm and 20 mm and 20 mm and 25 mm can be fastened fittingly to the mesh reinforcement using the same pipe clamp.

In an embodiment the coupling is integrated in the hinge. The pipe clamp can hereby be manufactured as one whole in for instance plastic.

In a further embodiment of the pipe clamp the first closing part is provided with a toothing directed toward a centre of the first arcuate part and the second closing part is provided with a toothing directed away from the centre for co-action with the toothing of the first closing part directed toward the centre. This is a known closure for closing the pipe clamp. In order to fasten the pipe clamp a first closing part is arranged under a wire of the mesh reinforcement and owing to the clamping the inward directed toothing of the first closing part co-acts with the outward directed toothing of the second closing part in order to close the clamp, and during further closing of the pipe clamp the pipe is connected fixedly to the wire of the mesh reinforcement. In an embodiment the pipe clamp is embodied in a plastic, for instance polypropylene.

In a first preferred embodiment the divided closure comprises a snap connection which is provided with at least one protrusion and at least one closing cavity co-acting with the protrusion. Through the use of the snap connection a more symmetrical force can be exerted during arranging of the pipe clamp round the pipes and the wires of the mesh reinforcement, so that undesirable rotation of the pipe clamp round the pipe is prevented.

In a second preferred embodiment the divided closure comprises an alternative snap connection which is provided with two tongues and two cavities co-acting with the tongues, wherein each of the arcuate parts is provided on either side of the second end with one tongue and with one cavity. In an optimally locked embodiment the divided closure further comprises locking elements for locking the tongues in the cavities.

An advantage of the alternative snap connection is that in a closed situation it is even more symmetrical relative to an axis through the hinge and the second ends of the arcuate parts, whereby lateral opening of the pipe clamp following arrangement thereof round the pipe is effectively prevented. When the closure lies immediately adjacently of the pipe in a closed position of the pipe clamp, the first and the second arcuate parts can clamp the pipe in form-fitting manner.

BRIEF DESCRIPTION OF THE DRAWINGS

Further advantages, features and details of the present invention will be elucidated on the basis of the following description of some preferred embodiments thereof. Reference is made in the description to the accompanying figures.

FIG. 5 shows a schematic side view of a second embodiment of the pipe clamp;

FIG. 6 shows a schematic side view of a third embodiment of the pipe clamp;

BEST MODE FOR CARRYING OUT THE INVENTION

Figure 1:
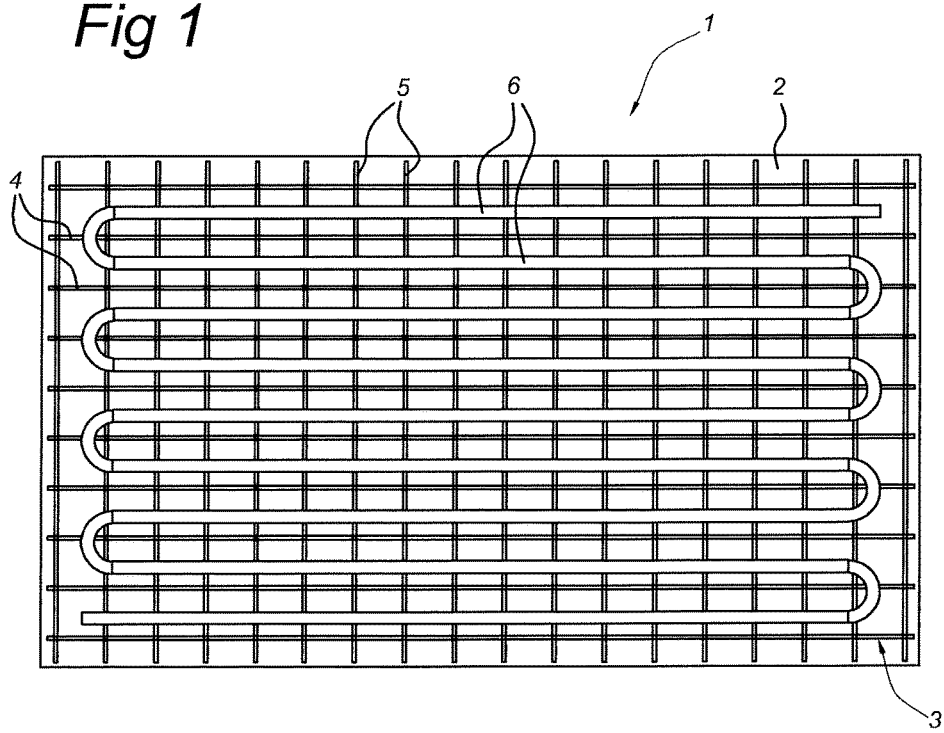
FIG. 1 shows a schematic top view of a concrete floor with a mesh reinforcement and a floor heating pipe lying thereon.

The same components are designated in the figures with the same reference numerals.

Figure 2:
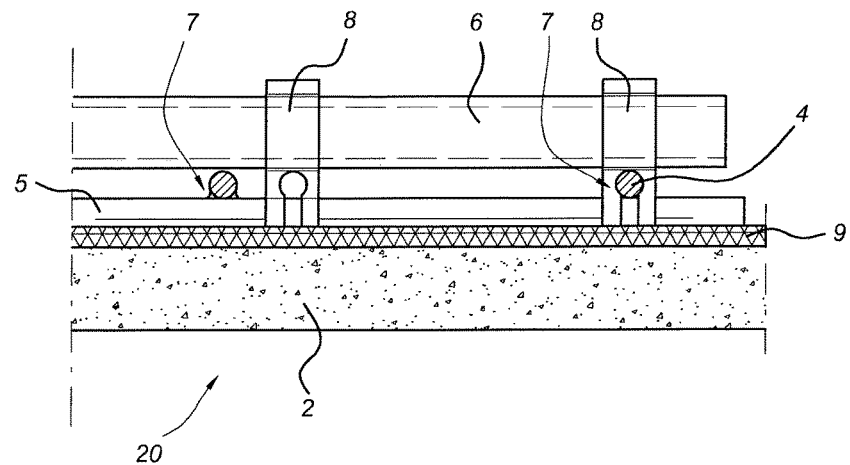
FIG. 2 shows a schematic side view of a concrete floor with a mesh reinforcement and a floor heating pipe lying thereon.

FIG. 1 and FIG. 2 show respectively a schematic top view and side view of a floor 1 with a concrete floor part 2 having a reinforcing mat or mesh reinforcement 3 arranged thereon. Mesh reinforcement 3 comprises crossed steel wires 4,5 which are fixed to each other at intersections 7, for instance by welding. Present on mesh reinforcement 3 is a pipe 6 which runs parallel to for instance a first steel wire 4 of mesh reinforcement 3. The pipe can be fastened using a pipe clamp 8 to an intersection 7 of the first steel wire 4 and a second steel wire 5 crossing the first steel wire 4 perpendicularly. Pipe clamp 8 can also be arranged on the single steel wire 4 or the steel wire 5 of mesh reinforcement. An insulating layer 9 can further be arranged between concrete floor 2 and mesh reinforcement 3.

Figure 3:
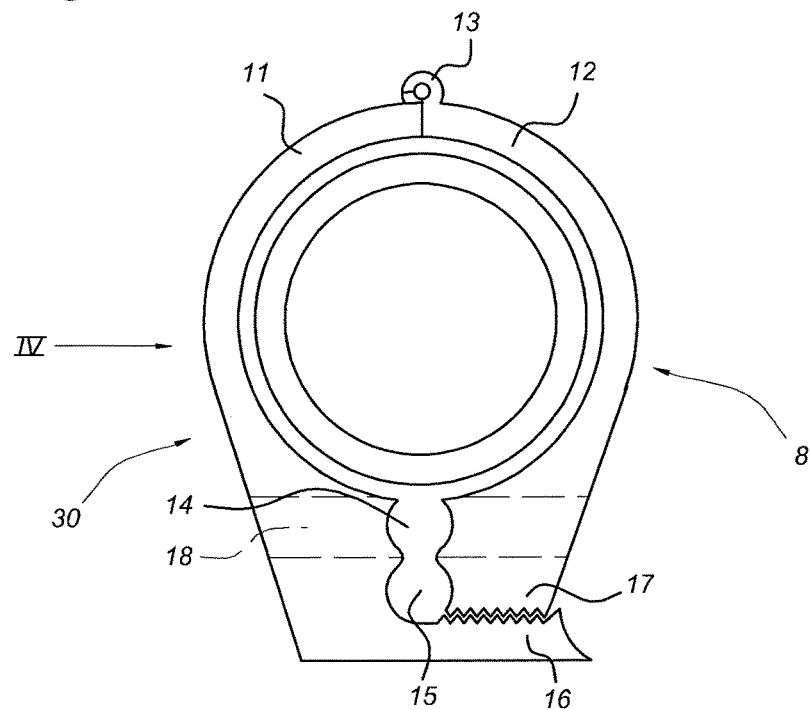
FIG. 3 shows a schematic side view of a first embodiment of the pipe clamp.

FIG. 3 shows a schematic side view of pipe clamp 8. The pipe clamp comprises arcuate parts 11,12 coupled to each other by means of a hinge 13. Hinge 13 is attached to the first ends of the first and the second arcuate part 11,12. A first closing part 16 is further provided on a second outer end of the first arcuate part 11 and the second arcuate part is provided with a second closing part 17. The first arcuate part 11 is provided with a first and a second recess 14,15 close to the second end, wherein second recess 15 is provided between first recess 14 and the second end of arcuate part 11. The second arcuate part 12 is likewise provided with a first recess 14 and a second recess 15, wherein first recess 14 is arranged close to the second outer end of the second arcuate part and second recess 15 lies between first recess 14 and the second end. The first recesses 14 and the second recesses 15 lie opposite each other so as to be able to clamp round a steel wire 4,5 of mesh reinforcement 3 in the closed position.

In an embodiment the pipe clamp 8 is provided with a third recess 18 close to the second end of the respective first and second arcuate parts 11,12. The opening of third recess 18 lies perpendicularly of the first and the second recess 14,15. Pipe clamp 8 can now be used to clamp pipe 6 at an intersection 7, wherein the first or the second recess 14,15 clamps round a steel wire 4 of the mesh reinforcement and the third recesses 18 clamp round a second steel wire 5 of mesh reinforcement 3, this second steel wire 5 lying transversely or perpendicularly of the first steel wire.

Pipe clamp 8 can be closed by means of a divided closure, a first closing part 16 of which is provided at the second end of the first arcuate part 11 and a second closing part 17 on the second arcuate part 12, wherein the first closing part 16 is provided with a toothing directed toward the centre of the arcuate part and the second closing part 17 with a toothing directed away from the centre of the arcuate part, wherein the toothings mesh together due to an elastic resilience of the pipe clamp. The pipe clamp can be manufactured integrally by means of injection moulding from a plastic, e.g. polypropylene, wherein the hinge and the closure are integrated with the arcuate parts.

Figure 4:
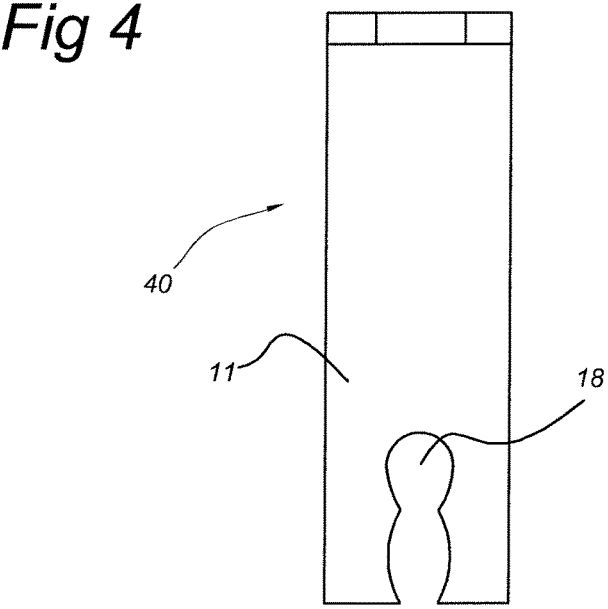
FIG. 4 shows a schematic front view of the first embodiment of the pipe clamp.

FIG. 4 shows a schematic front view of the first embodiment of the pipe clamp. This front view shows the third recess 18 in pipe clamp 8.

In a second embodiment of the pipe clamp the divided closure can comprise a snap connection.

FIG. 5 shows a side view of the second embodiment of pipe clamp 50 with the snap connection. The structure of the pipe clamp as shown in FIG. 5, with the exception of the snap connection, is identical to the structure of pipe clamp 8 as shown in FIG. 1 and FIG. 2. The snap connection comprises a protrusion 37 arranged on a second end of the second arcuate part 12 and a closing cavity 38 arranged on a second end of the first arcuate part 11, wherein closing cavity 38 co-acts with the protrusion. Closing cavity 38 and protrusion 37 are further arranged on the second end of respectively the first arcuate part 11 and the second arcuate part 12 such that first recess 14, second recess 15 and the third recess are positioned between closing cavity 38 or protrusion 37 and the second end of respectively the first and the second arcuate parts. An advantage of the snap connection is that in a closed position it is more symmetrical relative to an axis through the hinge and the second ends of the arcuate part, thereby preventing rotation of the pipe clamp round the pipe during arranging of the pipe clamp.

FIG. 6 shows a side view of a third embodiment of a pipe clamp 8 with a further recess 34 and a clamping element 35. The clamping element is arranged on hinge 13 by means of a coupling 33. Coupling 33 can be integrated with hinge 13 together with clamping elements 35 and arcuate parts 11,12 and be manufactured by means of injection moulding from a plastic, for instance polyethylene. By placing the arcuate clamping elements 35 between arcuate parts 11,12 and the pipe the pipe clamp 8 can be applied to clamp pipes of differing diameter, for instance respectively 16 mm and 18 mm or 17 mm and 18 mm.

When the diameter of the pipe to be fastened is sufficiently small compared to the diameter of a pipe clamp in the closed position, clamping elements 35 will not be pressed into the further recesses 34 during fastening of the pipe and clamping elements 35 will clamp the pipe along a part of the periphery which makes contact with the clamping elements and another peripheral part of the arcuate elements 11,12. When the pipe for fastening has a larger diameter, clamping elements 35 will be pressed into the further recesses 34 of arcuate parts 11,12 and clamping elements 35 will clamp the pipe fittingly along a part of the periphery which makes contact with clamping elements 35 and a further peripheral part of arcuate elements 11,12.

In an embodiment the clamping elements 35 can also comprise a plurality of arcuate parts which are connected at different points to arcuate parts 11,12.

FIG. 5 shows a side view of a pipe clamp 50 provided with four clamping elements 35 which are connected at several locations to arcuate parts 11,12. The uppermost clamping elements are further connected to hinge 13 by means of a coupling 33. The pipe clamp can be integrated with the clamping element and be manufactured in a plastic, for instance polyamide, by means of an extrusion process.

Figure 7:
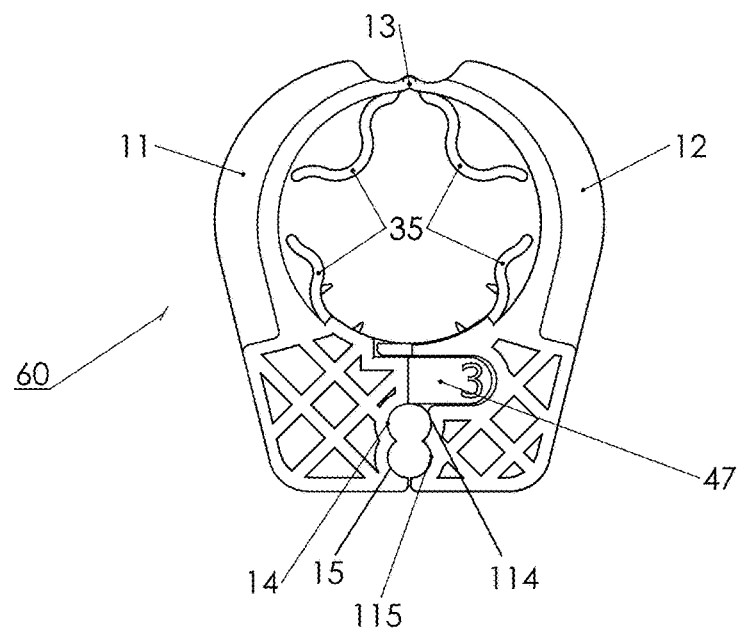
FIG. 7A shows a schematic side view of a fourth embodiment of the pipe clamp in closed position.
FIG. 7B shows a perspective view of the fourth embodiment in open position.
FIG. 7C shows a bottom view of the fourth embodiment in open position.
Figure 7:
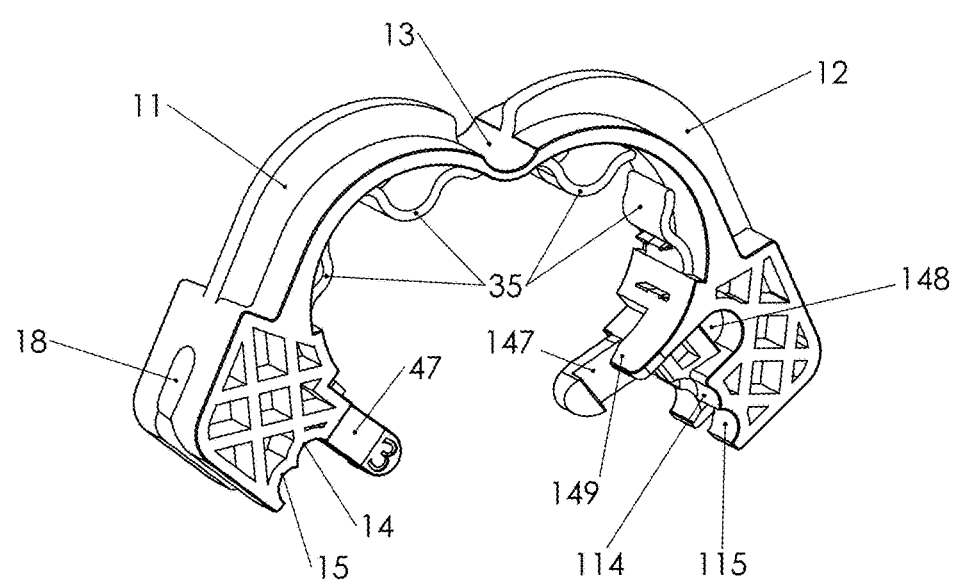
Figure 7:
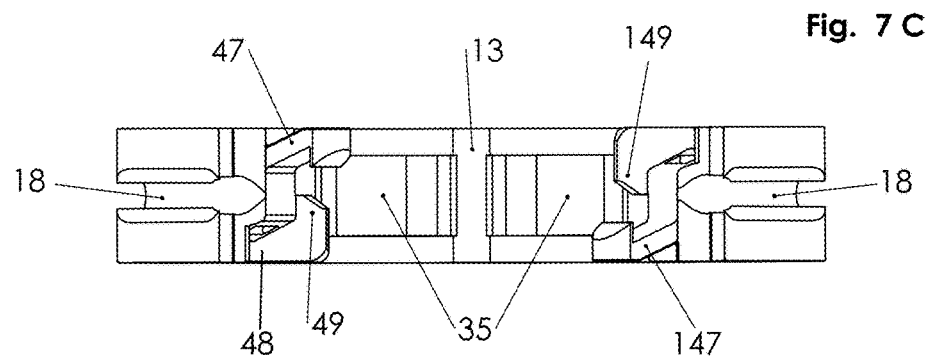

FIGS. 7A, 7B and 7C show the fourth embodiment of pipe clamp 60 with an alternative snap connection. FIG. 7A shows pipe clamp 60 in the closed position. FIG. 7B shows clamp 60 in open position from a first viewpoint. FIG. 7C shows a bottom view of pipe clamp 60 in open position. The structure of pipe clamp 60 is identical to the structure of pipe clamp 50 as shown in FIG. 5, with the exception of the snap connection. The alternative snap connection comprises a plurality of resilient hooks or tongues 47, preferably a pair of tongues 47, 147 and a plurality of cavities 48, preferably a pair of cavities 48, 148, co-acting with the tongues. As in the embodiment according to FIG. 5, both the protrusions or tongues and the (closing) cavities are arranged on the second ends of arcuate parts 11,12. In the shown preferred embodiment 60 both arcuate parts comprise on either side a tongue 47, 147 and a cavity 48, 148. The position of tongue 47 and cavity 48 on the first arcuate part 11 is mirrored relative to the position of tongue 147 and cavity 148 on the second arcuate part 12. Each arcuate part 11,12 is preferably further provided on the second end with a projection 49, 149 arranged adjacently of cavity 48, 148 for the purpose of locking the tongues 47, 147 in the closed position. The projections or locking elements 49, 149 are provided on sides facing each other with a chamfered portion for urging tongues 47, 147 further into cavities 148, 48. In preferred embodiment 60 recess 14 lies between closing parts 47, 48 and recess 15 and recess 114 lies beside closing parts 147, 148 and recess 15, as in the embodiment according to FIG. 5 in which recess 14 lies between closing part 38 and recess 15 and recess 114 lies beside closing part 37 and recess 115.

In the closed position of pipe clamp 50; 60 the closing parts 37, 38; 47, 48, 147, 148 lie between the pipe and the wires of the mesh reinforcement.

In the preferred embodiments shown in FIGS. 3 and 6 recess 15 lies between closing part 16 and recess 40. In the closed position of pipe clamp 8 closing part 16 lies under the wires of the mesh reinforcement.

All the preferred embodiments of the pipe clamp have in common that one of the two recesses always lies between at least one of the closing parts and the other recess.

In summary, the invention relates to a pipe clamp for coupling a pipe to a mesh reinforcement provided with two co-acting arcuate parts. Such a pipe is for instance a pipe of a floor heating system. The pipe clamp comprises a hinge coupled to respective first ends of a first and a second arcuate part, and a divided closure, a first closing part of which is provided at a second end of a first arcuate part and a second closing part of which is provided at a second end of the second arcuate part, wherein the arcuate parts are provided close to the second end with a first recess for clamping round the pipe on a first wire of the mesh reinforcement in the closed position. Because the mesh reinforcement can be provided with meshes of wires which run transversely over each other and may be a different distance from the pipe, the pipe clamp is further provided with a second recess for clamping round the first wire of the mesh reinforcement in the closed position, whereby the pipe can be fixed flat over the mesh reinforcement. In the closed situation the first and the second recesses lie opposite each other, and one of the two recesses is always located between at least one of the closing parts and the other recess.

The present invention is not limited to the preferred embodiments thereof described here. The rights sought are defined rather by the following claims, within the scope of which many modifications can be envisaged.

The invention claimed is:

1. A pipe clamp for coupling a pipe to a mesh reinforcement, provided with two co-acting arcuate parts for clamping round the pipe, the two co-acting parts comprising a first arcuate part and a second arcuate part, a hinge coupled to respective first ends of the first and the second arcuate part, and a divided closure, a first closing part of which is provided at a second end of the first arcuate part and a second closing part of which is provided at a second end of the second arcuate part, characterized in that the first arcuate part is further provided at the second end with a first recess and a second recess and the second arcuate part is further provided at the second end with a fourth recess and a fifth reces, wherein the first recess and the fourth recess lie opposite each other in a closed position of the pipe clamp and the second recess and the fifth recess lie opposite each other in the closed position of the pipe clamp for clamping round a first wire of the mesh reinforcement, wherein the first recess is always located beside both the first closing part and the second recess, wherein the fourth recess is always located beside both the second closing part and the fifth recess, wherein in the closed position of the pipe clamp the closing parts are located between the arcuate parts for clamping round the pipe and the first, second, fourth and fifth recesses for clamping round the first wire of the mesh reinforcement, wherein the pipe clamp is provided with a third recess close to the second end of the first arcuate part, the third recess also close to the second end of the second arcuate part, wherein a clamping opening of the third recess lies transversely of clamping openings of the first, second, fourth and fifth recess for clamping in the closed position of the pipe clamp round a second wire of the mesh reinforcement crossing the first wire.

2. A pipe clamp as claimed in claim 1, wherein the divided closure comprises a snap connection which is provided with two tongues and two cavities co-acting with the tongues, wherein the first arcuate part is provided on the second end with a first tongue and with a first cavity and wherein the second arcuate part is provided on the second end with a second tongue and with a second cavity.

3. A pipe clamp as claimed in claim 2, wherein the divided closure further comprises a first locking element for locking the second tongue in the first cavity and a second locking element for locking the first tongue in the second cavity.

4. A pipe clamp as claimed in claim 3, wherein the first locking element is formed by a projection further provided on the second end of the first arcuate part and arranged adjacently of the first cavity and the second locking element is formed by a projection further provided on the second end of the second arcuate part and arranged adjacently of the second cavity.

5. A pipe clamp as claimed in claim 4, wherein the first and second locking elements are provided on sides facing each other with a chamfered portion both for urging the first tongue further into the second cavity and for urging the second tongue further into the first cavity.

6. A pipe clamp as claimed in claim 1, wherein the divided closure comprises a snap connection which is provided with at least one protrusion and at least one closing cavity co-acting with the protrusion.

7. A pipe clamp as claimed in in claim 1, wherein the hinge is integrated into the first ends of the co-acting arcuate parts.

8. A pipe clamp as claimed in claim 1, wherein the arcuate parts are provided on an inner side with a clamping element for clamping a peripheral part of the pipe in the closed position of the pipe clamp.

9. A pipe clamp as claimed in claim 8, wherein a first end of the clamping element is coupled to the hinge via a coupling.

10. A pipe clamp as claimed in claim 9, wherein the coupling is integrated in the hinge.

11. A pipe clamp as claimed in claim 8, wherein the arcuate parts are provided with a further recess for receiving the clamping elements.

12. A pipe clamp as claimed in claim 11, wherein in a first position of a coupling the clamping elements partially fill the further recess for clamping a pipe with a first diameter to a wire of the mesh reinforcement.

13. A pipe clamp as claimed in claim 12, wherein in a second position of a coupling the clamping elements fill the further recesses for clamping a pipe with a second diameter which is greater than the first diameter.

14. A pipe clamp as claimed in claim 1, wherein the pipe clamp is embodied in plastic.

* * * * *